July 25, 1950  H. DUNN  2,516,305
LATHE ATTACHMENT
Filed Feb. 28, 1946  4 Sheets-Sheet 1
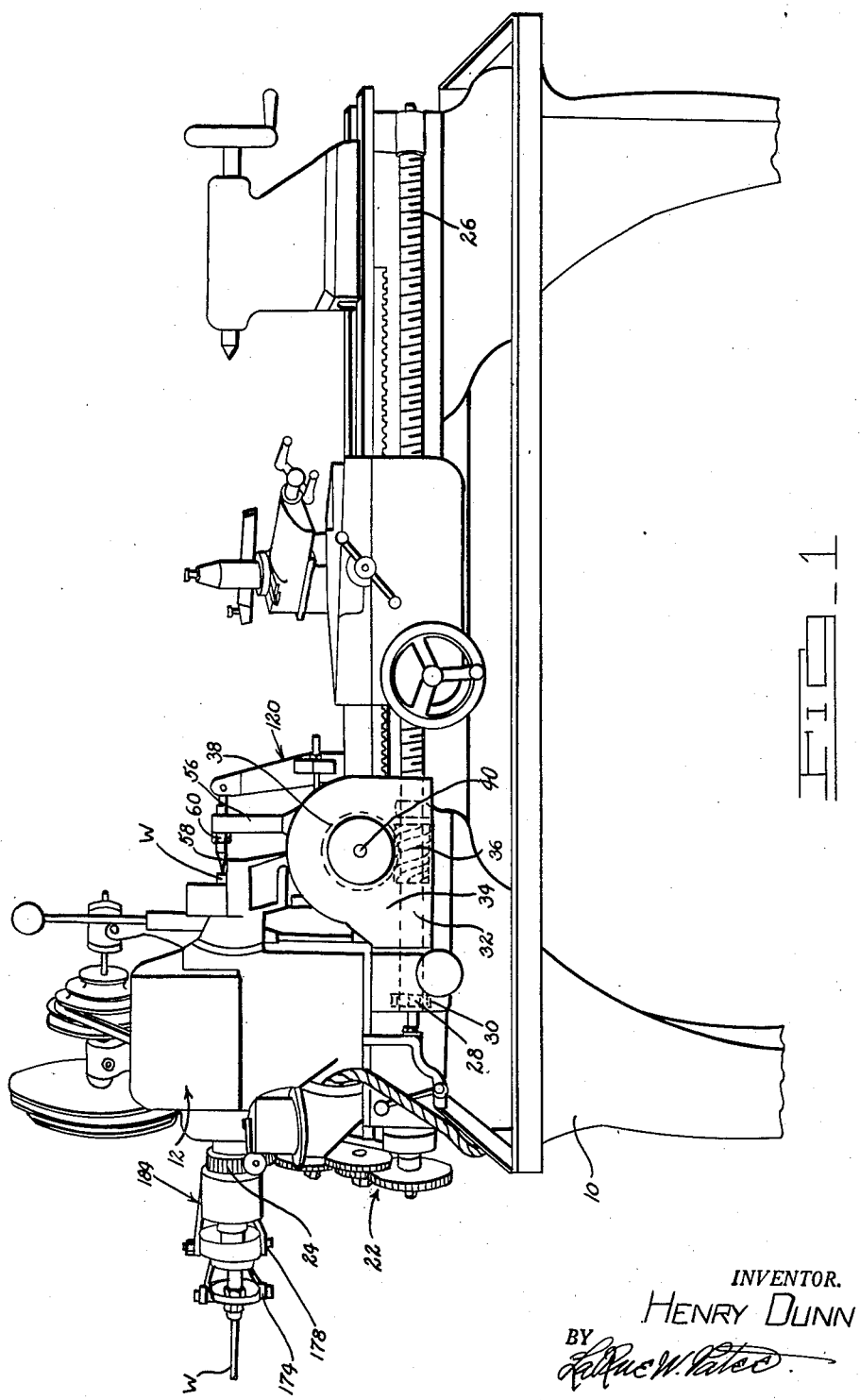
INVENTOR.
HENRY DUNN
BY
ATTORNEY July 25, 1950
H. DUNN
2,516,305
LATHE ATTACHMENT
Filed Feb. 28, 1946
4 Sheets-Sheet 2
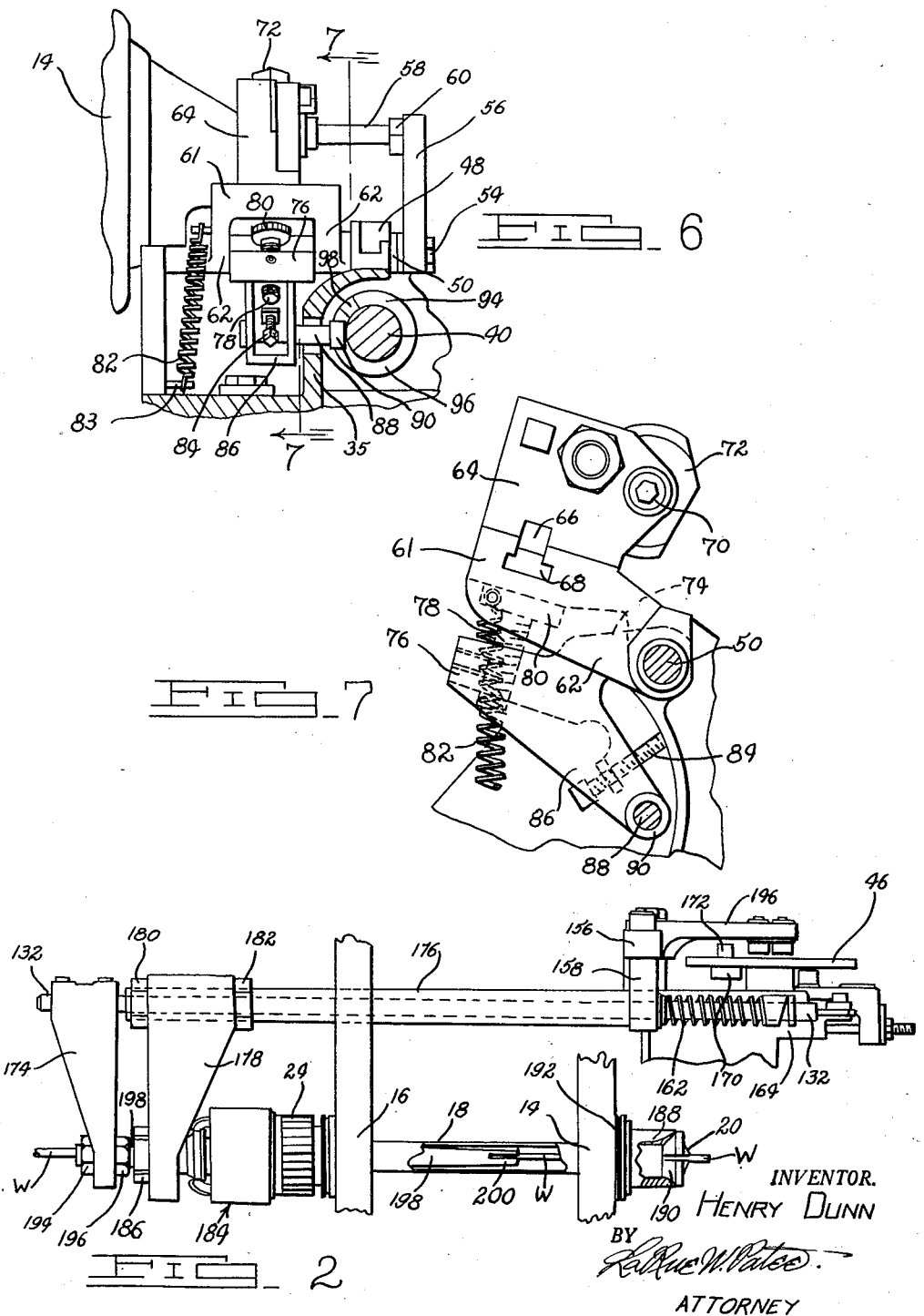
INVENTOR.
HENRY DUNN
BY LaRue W. Patee
ATTORNEY July 25, 1950  H. DUNN  2,516,305
LATHE ATTACHMENT
Filed Feb. 28, 1946  4 Sheets-Sheet 3
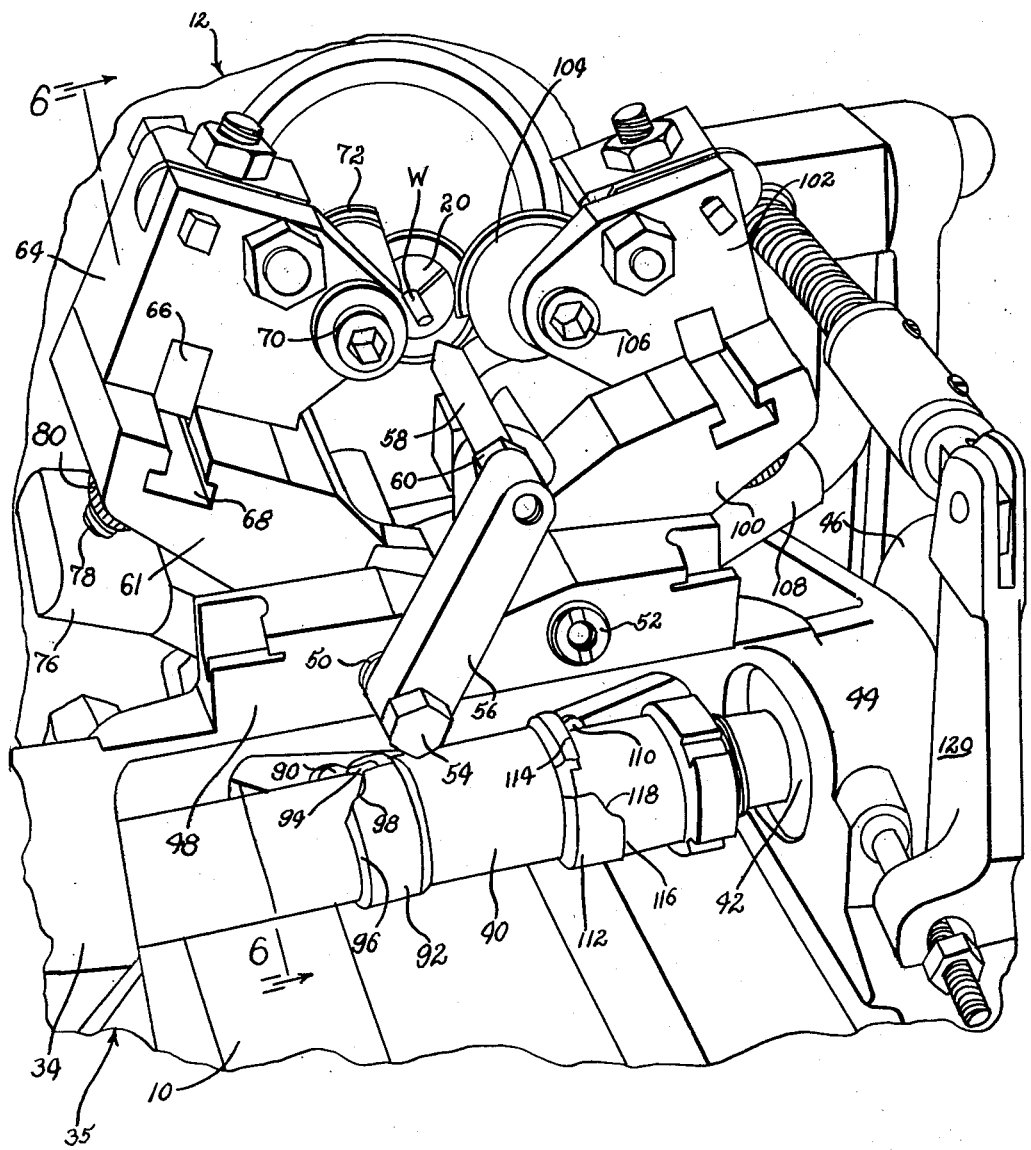
FIG_3
INVENTOR.
HENRY DUNN
BY
ATTORNEY July 25, 1950          H. DUNN          2,516,305
LATHE ATTACHMENT
Filed Feb. 28, 1946          4 Sheets-Sheet 4
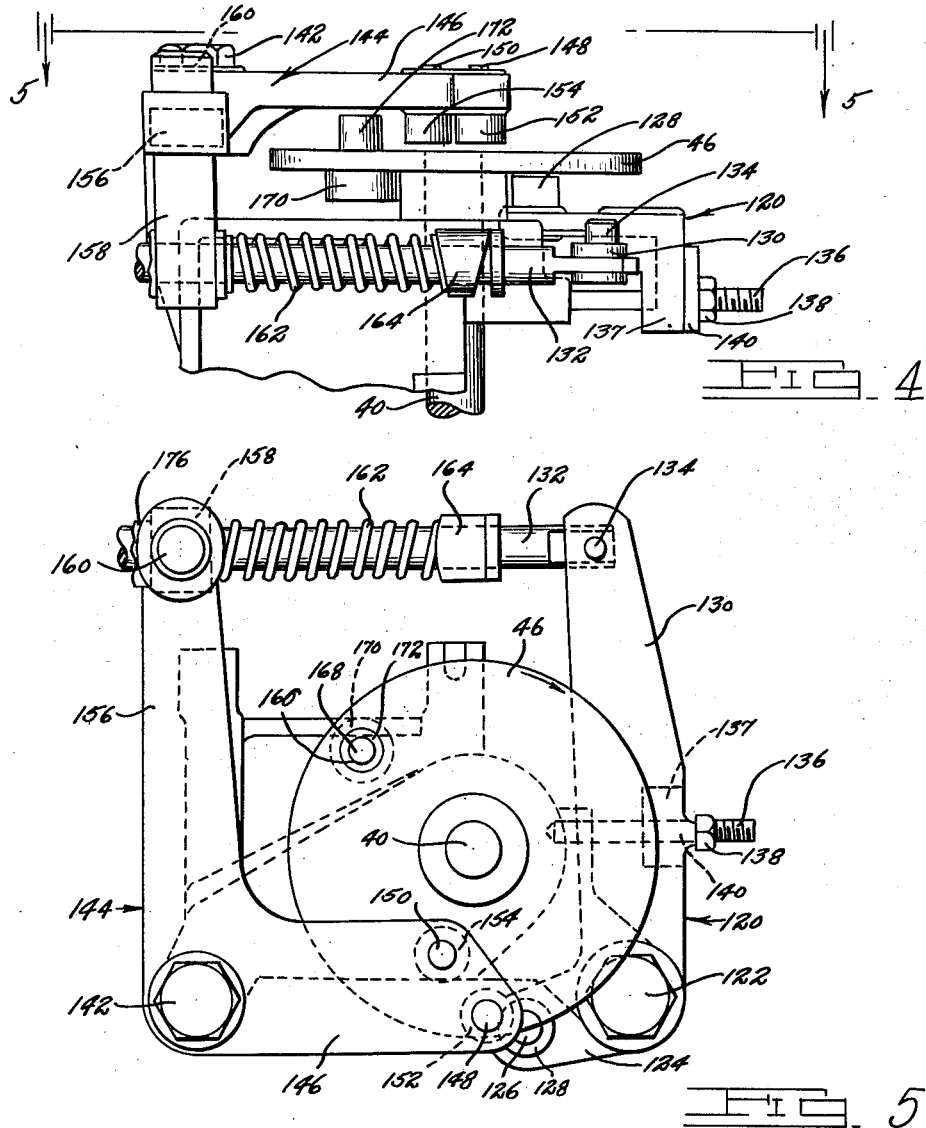
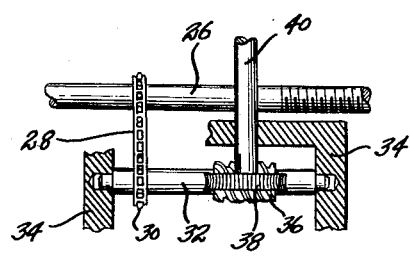
INVENTOR.
HENRY DUNN
BY
ATTORNEY Patented July 25, 1950

2,516,305

UNITED STATES PATENT OFFICE 2,516,305

LATHE ATTACHMENT

Henry Dunn, Detroit, Mich.

Application February 28, 1946, Serial No. 650,855

8 Claims. (Cl. 29—56)

This invention relates to an attachment for lathes, and has for an object the provision of such an attachment which will make it possible to automatically machine or shape parts on the lathe from a long piece of stock which is inserted into and fed through the lathe headstock, the stock being gripped in and driven by a collet located adjacent the lathe front bearing.

An object of the invention is to provide an automatic attachment for a lathe which may be readily applied to a standard lathe to eliminate the purchase of an expensive automatic machine where a standard lathe is available.

Another object is to provide such an attachment which, as soon as the machining or shaping operation has been completed, will automatically cut off the part from the piece of stock, the part dropping down through a chute into a receptacle.

A further object is to provide such an attachment which, after the machined part has been severed from the piece of stock by the cut-off mechanism, will automatically release the gripping action of the collet, and while the latter is so released, will advance the piece of stock through the headstock until it engages a stop so that it will be in proper position for the next machining or shaping operation, after which the collet is again placed in gripping relationship to the piece of work.

Other objects and advantages of the invention will be apparent upon reference to the following description and accompanying drawings, in which:

Fig. 1 is a front elevational view of a lathe, showing the attachment applied thereto;

Fig. 2 is a plan view of the headstock portion of the lathe, with some of the usual lathe parts removed, showing the attachment in a somewhat diagrammatic manner;

Fig. 3 is a perspective view, taken from the right hand side of the lathe headstock, showing the tools for shaping and cutting off the work, and the cams which cause such tools to move into and out of engagement therewith;

Fig. 4 is a plan view of the mechanism which serves to actuate the collet releasing and work advancing means;

Fig. 5 is a view taken in the direction of the line 5—5 of Fig. 4;

Fig. 6 is a sectional view, taken on the line 6—6 of Fig. 3;

Fig. 7 is a sectional view, taken on the line 7—7 of Fig. 6; and

Fig. 8 is a fragmentary top plan view of the driving connection between the lead screw and the shaft shown in Fig. 1.

The reference numeral 10 indicates the bed of a lathe of conventional construction, upon which is mounted a headstock designated generally at 12. As shown in Fig. 2, 14 is the front bearing of the headstock, while 16 is the rear bearing thereof. 18 is a tube which is journaled in the spindle which is in turn journaled in these bearings, and through it the work, which in the present case is shown as being a continuous rod designated as W, extends, the right hand end of this rod being held in a collet 20, which is of conventional construction. This collet is attached to the tube 18, and when the latter is moved to the right, by mechanism to be later described, the collet opens, thereby releasing its grip on the rod so that the latter may be advanced into a new position by other mechanism which will also be described later.

Referring to Fig. 1, the usual lathe gearing, designated generally at 22, is driven by a gear 24 which is connected to the lathe spindle and is driven by the latter. The lathe gearing 22 serves to drive in the usual manner the lathe lead screw 26. Mounted on this lead screw is a sprocket (not shown) which through a chain 28 drives a sprocket 30 mounted on a shaft 32 which is parallel to the lead screw and is located within a housing 34. The opposite end of the shaft 32 carries a worm 36 which serves to drive a worm gear 38 secured to the end of a cam shaft 40 which is journaled in housing 34 formed as a part of a carrier 35 secured to the lathe bed.

As shown in Fig. 3, this cam shaft extends across the lathe, its opposite end being journaled in and extending through bearing 42 in portion 44 of the carrier 35. Secured to the outer end of the cam shaft is a circular disc 46, which serves to actuate the collet releasing and work advancing mechanism to be described hereinafter. 48 is a portion of the carrier which extends across the lathe between the housing 34 and the bearing portion 44.

Secured in the portion 48 of the carrier are two pivot pins 50 and 52. Threaded into the end of pivot pin 50 is a bolt 54 which secures in place an arm 56 which has threaded into its upper end a stop member 58 which is locked in position by a lock nut 60. As shown in Figs. 6 and 7 pivotally mounted upon the pin 50 is a tool support 61 which has two spaced apart portions 62 through which the pin 50 extends. Secured to the upper face of the support 61 is a tool holder 64, a key 66 carried by the holder fitting into a keyway 68 formed in the support. Secured in the tool holder by a screw 70 is a circular cut off tool 72.

Pivotally supported on the pin 50 in the space between the portions 62 of the member 61 is an arm 74 of a pivot member 76. Threaded into the member 76 is an adjustable screw 78, against the head 80 of which the tool support 61 rests. A tension spring 82, the lower end of which is secured to a pin 83 held in the carrier and the upper end of which is connected to the tool support serves to normally hold the tool holder and the pivot member in their lowermost position, as shown in Fig. 7, such downward movement being limited by an adjustable stop screw 84 which is threaded into an arm 86 extending downwardly from the pivot member, the end of the screw engaging the carrier to limit such movement. Secured in the lower end of the arm 86 is a pin 88 upon which is mounted a roller 90.

Secured to the shaft 40 is a cam ring 92 having a low portion 94 and a high portion 96 connected by a cam surface 98. The arm 86 of the pivot member is so located that the roller 90 bears against this cam ring, being held in contact therewith by the spring 82. As the shaft 40 is rotated, the roller 90 rides up on the cam surface 98 onto the high portion 96 of the cam ring, and this causes the pivot member 76 to swing on the pin 50, and since the head 80 of the screw 78 carried by the member bears against the tool holder 65, the latter is also caused to pivot about the pin 50 so that the cut off tool 72 is held in contact with the work W for a sufficient length of time to cut through the latter. By the time this cutting off operation is completed, the cam ring has revolved enough so that the roller 90 is back on the low portion 94 again which permits the pivot member 76 and the tool holder to be pulled back down to their normal position by the spring 82.

Substantially the same structure is mounted on the pivot pin 52, the tool support on that side being designated as 100 and the tool holder as 102. The circular tool held by the tool holder 102 is a shaping tool 104 adapted to perform a shaping operation on the work W when it is moved into contact therewith. It is held in place in the holder by screw 106. A pivot member 108 supported on the pin 52 between the legs of the tool support has a downwardly extending arm which carries a pin on which is mounted a roller 110, similar to the arm 86, pin 88 and roller 90 on the opposite side. 112 is a cam ring secured to the shaft 40, and this cam ring has a low portion 114 and a high portion 116 connected by a cam surface 118.

This structure operates in the same manner as that on the other side of the lathe, i. e. as the cam shaft 40 is rotated, the roller 110 rides up the cam surface 118 onto the high portion 116 of the cam ring, which rocks the pivot member 108 about the pin 52, causing the tool support 100 and the tool holder to swing toward the work W, which is being revolved, bringing the tool 104 into contact with the work and holding it there until the shaping operation has been completed, at which time the roller 110 has worked back down onto the low portion 114 of the cam ring, which allows the pivot member, the tool support and the tool holder to be pulled back down to their normal position by the spring on that side which is similar to the spring 82.

Referring now to Figs. 4 and 5, 120 is a lever which is pivoted at 122 on the carrier, and which has a short arm 124 in which is mounted a pin 126 on which a roller 128 is journaled. The lever 120 also has a long upwardly extending arm 130, to the end of which is secured a rod 132 by a pin 134. 136 is a bolt extending from the carrier through a portion 137 on the arm 130 and having a nut 138 threaded thereon, this nut being adapted to engage a portion 140 on the arm 130 to limit the swinging movement of the lever to the right, as viewed in Fig. 5.

Also pivoted on the carrier, by bolt 142, is a lever 144 having an arm 146 carrying pins 148 and 150, on which are journaled rollers 152 and 154. The lever 144 also has an upwardly extending arm 156 which has a block 158 pivotally connected to it by pin 160. The rod 132 extends through an aperture formed in the block 158. A compression coil spring 162 surrounds the rod, one end bearing against the block and the other end seating against a collar 164 secured to the rod 132.

The disc 46 has a hole 166 formed in it, and in hole 166 is located a pin 168 which carries a roller 170 on one side of the disc, and a relatively smaller roller 172 on the opposite side.

Referring now to Fig. 2, it will be seen that the rod 132 extends to the left past the end of the headstock, and has secured to its end an arm 174. Surrounding the rod 132 is a tube 176, one end of which is secured to the block 158, and the other end of which has an arm 178 secured on it by nuts 180 and 182 which are threaded onto the tube 176.

The tube 18 is connected through a mechanism designated generally as 184, which forms no part of the present invention, to the arm 178 by a nut 186. The opposite end of the tube, which is rotatably and slidably supported in the lathe spindle of the headstock, extends through a collar 188 attached to the lathe spindle which has a tapered bore 190. The outer surface of the collet 20 is similarly tapered, so that as it is moved to the left, as viewed in Fig. 2, by the tube 18 through the action of the compression spring 162 which by bearing against the block 158 tends to move the tube 176 in that direction, the collet is compressed against the work W, thereby gripping the latter, and since the collet is connected to the collar 188 which is attached to the lathe spindle, which is powered in the usual way, the work W is rotated thereby. Since the collet seats tightly in the collar 188 to produce the gripping action on the work, the collet must rotate with the collar, and since there is an end thrust created by the action of the spring 162 in drawing the collet into the collar, an end thrust bearing 192 is provided.

Connected to the arm 174 by nuts 194 and 196 which are threaded on it, is a sleeve 198 which extends through the mechanism 184 and into the tube 18, where it has secured to its end a plurality of spring fingers 200 which bear against the work W.

Taking up now the operation of the above described mechanism, it will be assumed that the lathe controls have been set so that the gear 24 and the lead screw 26 are being driven, so that the cam shaft 40, which is driven from the lead screw as previously described, is rotating. At this time, the end of the work W will be against the stop 58. Through the action of the roller 110 on the pivot member 108 riding up the cam surface 118 onto the high portion 116 of the cam ring 112, the tool support 100 is swung about the pivot pin 52 to a position where the circular shaping tool 104 is brought into contact with the work W, which is being rotated by gear 24, and is held in that position long enough for the shaping operation to be completed, by which time the cam ring 112 has rotated to a point where the roller 110 is back, down on the low portion 114 thereof, which permits the tension spring (similar to spring 82 on the other side) to pull the tool holder 100 back down to its normal position wherein the tool 104 is out of contact with the work W.

Since the shaping operation has now been completed, the next step is to cut off the shaped part of the work. To do this at the proper time, the position of the cam ring 92 on the shaft 40 is so fixed with reference to the cam ring 112 that as soon as the tool 104 has moved away from the work W, the roller 90 rides up the cam surface 98 onto the high portion 96, which causes the pivot member 76 and the tool support 61 to swing on the pivot pin 50 to a position wherein the cut off tool 72 will be held in contact with the work W long enough to cut through the latter, whereupon the shaped part of the work will drop down and will be conducted through a trough into a receptacle.

Immediately after this has taken place, the roller 170 carried by the disc 46 which is also being rotated by the cam shaft 40, engages roller 128 on the lever 120. As viewed in Fig. 5, the disc 46 is rotating in a clockwise direction and therefore the roller 170 rides over the top of the roller 128, forcing the latter downwardly and thereby causing the lever 120 to pivot about the bolt 122 so that the upper end of the arm 130, and the rod 132 which is secured thereto, is moved to the left, the rod 132 sliding through the block 158 and the tube 176.

Referring now to Fig. 2, it will be seen that this movement of the rod 132, which is to the left as viewed in this figure, causes the arm 174, which is secured to the rod 132, to move to the left. Since the other end of the arm 174 is secured to the outer end of the sleeve 198, this causes the latter to be moved to the left, resulting in the spring fingers 200, which are secured to the inner end of the sleeve, sliding to the left on the work W. The work W cannot move at this time, since it is firmly gripped by the collet 20, so that the spring fingers merely slide on it.

The next step is to release the collet so that the work W can be advanced to present a new portion to be worked upon. By the time this is to be done, the small roller 172 carried by the disc 46 has advanced to a position wherein it engages roller 152 on arm 146 of lever 144, as shown in Fig. 5. This causes roller 152 to be forced downwardly, swinging the arm 146 in that direction and pivoting the lever 144 about the bolt 142, so that the upper end of the arm 156 on that lever is moved to the right, as viewed in Fig. 5. This moves the tube 176 in that direction.

Referring again to Fig. 2, it will be seen that such movement of the tube 176, which is to the right as viewed in that figure, will cause the arm 178 which is secured thereto to move in that direction. Since the tube 18 is secured, through the medium of the mechanism 184, to the arm 178, it will likewise be moved to the right, and as the collet 20 is secured to the tube 18, it will be moved out of the tapered bore 190, permitting it to expand sufficiently to release its grip on the work W. As soon as it is released, the rod 132 which is urged toward the right, as viewed in Fig. 2, by the compression spring 162, which has been further compressed at this time due to the swinging of the arm 156 to the right as viewed in Fig. 5, pulls the bracket 174 and the sleeve 198, which is connected to it, to the right, as seen in Fig. 2, and the spring fingers 200 on the inner end of the sleeve grip the work W and slide it through the collet, which is in released position at this time, until the end of the work W abuts against the stop 58. This advancing movement of the work W through the collet is done very quickly, and by the time it is completed, the roller 172 engages the roller 154 on the disc, passing between it and the roller 152, and causes the arm 146 on the lever 144 to be swung upwardly thereby moving the upper end of the arm 156, the block 158 and the tube 176 secured thereto, to the left, as viewed in Fig. 5.

Referring again to Fig. 2, this movement of the tube 176, which is to the left as viewed in that figure, causes the tube 18 to move in that direction, which results in the collet 20, which is secured to the end of the tube, being drawn back into the tapered bore 190 of the collar 188, in which position it tightly grips the work W to hold and drive the latter.

This completes a cycle of operations, and the parts are now in position to start over again the sequence of operations just described. It will be seen that the mechanism is fully automatic, and that it will go on performing the shaping operation on the end of the work W and cutting off the shaped portion indefinitely.

While a specific embodiment of the invention has been shown and described, it will be understood that various changes in details of construction and arrangement of the parts may be made without departing from the spirit and scope of the appended claims.

I claim:

1. An attachment for a lathe which includes a headstock and a lead screw having a sprocket secured thereon, comprising a carrier adapted to be secured to the lathe adjacent the headstock, a shaft journaled in the carrier in parallel relation to the lead screw, a sprocket mounted on said shaft, a chain serving to drive the sprocket on the shaft from the sprocket on the lead screw, a second shaft rotatably supported in the carrier and extending transversely to the first shaft, gearing serving to drive the second shaft from the first, a plurality of tool supports pivotally mounted on said carrier, a tool carried by each of said supports, and means on said second shaft adapted to sequentially move said supports into position wherein the tools carried thereby will be held in contact with a workpiece supported in the headstock.

2. An attachment for a lathe which includes a headstock and driving gearing, comprising a collet supported in the headstock and driven from the lathe gearing, said collet being adapted to grip a workpiece extending through the headstock, a carrier adapted to be secured to the lathe adjacent the headstock, a shaft journaled in the carrier, said shaft extending transversely of the axis of the headstock and being driven from the lathe gearing, a plurality of tool supports pivotally mounted on said carrier, a tool carried by each of said supports, a plurality of cams mounted on said shaft, said cams being adapted to move said supports sequentially to positions wherein the tools carried thereby will be held in contact with the workpiece, and means actuated by said shaft adapted to move said collet to released position when it is desired to advance the workpiece to a new position therein.

3. An attachment for a lathe which includes a headstock and driving gearing, comprising a collet supported in the headstock and driven from the lathe gearing, said collet being adapted to grip a workpiece extending through the headstock, a carrier adapted to be secured to the lathe adjacent the headstock, a shaft journaled in the carrier, said shaft extending transversely of the axis of the headstock and being driven from the lathe gearing, a plurality of tool supports pivotally mounted on said carrier, a tool carried by each of said supports, a plurality of cams mounted on said shaft, said cams being adapted to move said supports sequentially to positions wherein the tools carried thereby will be held in contact with the workpiece, a disc mounted on said shaft, and means actuated by said disc adapted to move said collet to released position when it is desired to advance the workpiece to a new position therein.

4. An attachment for a lathe which includes a headstock and driving gearing, comprising a driven collet serving to hold a workpiece in the headstock, a workpiece feeding member, a carrier adapted to be secured to the lathe bed adjacent the collet, a plurality of tool holders movably supported on said carrier, a tool carried by each of said holders, a shaft journaled in said carrier and driven from the lathe gearing, mechanism associated with said shaft adapted to sequentially move said tools into engagement with the workpiece to perform operations thereon, and means actuated by said shaft adapted to release the collet when the last of said operations has been completed and to cause said feeding member to advance the workpiece to a new position in the collet while the latter is held in released position.

5. An attachment for a lathe which includes a headstock and driving gearing, comprising a tube rotatably and slidably supported in the headstock and driven from the lathe gearing, a collet secured to said tube and serving to grip a workpiece extending through the tube, a carrier adapted to be secured to the lathe adjacent the headstock, a shaft journaled in said carrier, said shaft being driven from the lathe gearing, a plurality of tools movably supported from said carrier, mechanism associated with said shaft adapted to sequentially move said tools into contact with the workpiece, and means operated by said shaft adapted to cause said tube to slide in the headstock when it is desired to release the collet to advance the workpiece to a new position therein.

6. An attachment for a lathe which includes a headstock and driving gearing, comprising a tube rotatably and slidably supported in the headstock and driven from the lathe gearing, a collar rotatably supported on the headstock, a collet secured to the tube and normally seating in the collar to grip a workpiece which extends through the tube, a carrier adapted to be secured to the lathe adjacent the headstock, a shaft journaled in said carrier, said shaft being driven from the lathe gearing, a plurality of tools movably supported from said carrier, mechanism associated with said shaft adapted to sequentially move said tools into contact with the workpiece, and means operated by said shaft adapted to cause said tube to slide in the headstock thereby moving the collet out of engagement with the collar to release the collet when it is desired to advance the workpiece to a new position therein.

7. An attachment for a lathe which includes a headstock and driving gearing, comprising a tube rotatably and slidably supported in the headstock and driven from the lathe gearing, a collet secured to said tube and serving to grip a workpiece extending through the tube, a feeding member located inside the tube and frictionally engaging the workpiece, a carrier adapted to be secured to the lathe adjacent the headstock, a shaft journaled in said carrier, said shaft being driven from the lathe gearing, a plurality of tools movably supported from said carrier, means associated with said shaft adapted to sequentially move said tools into contact with the workpiece, and other means operated by said shaft adapted to move said feeding member to advance the workpiece to a new position in the collet when the latter is released.

8. An attachment for a lathe which includes a headstock and driving gearing, comprising a tube rotatably and slidably supported in the headstock and driven from the lathe gearing, a collar rotatably supported on the headstock, a collet secured to the tube and normally seating in the collar to grip a workpiece which extends through the tube, a feeding member located inside the tube, and frictionally engaging the workpiece, a carrier adapted to be secured to the lathe adjacent the headstock, a shaft journaled in said carrier, said shaft being driven from the lathe gearing, a plurality of tools movably supported from said carrier, mechanism associated with said shaft adapted to sequentially move said tools into contact with the workpiece, means actuated by said shaft adapted to cause said tube to slide in the headstock thereby moving the collet out of engagement with the collar to release the collet, and other means actuated by said shaft adapted when the collet is so released to move said feeding member whereby it will advance the workpiece to a new position in the collet.

HENRY DUNN.

REFERENCES CITED

The following references are of record in the file of this patent:

UNITED STATES PATENTS

| Number | Name | Date |
| --- | --- | --- |
| 587,598 | Noyes | Aug. 3, 1897 |
| 622,760 | Davenport | Apr. 11, 1899 |
| 1,441,370 | Olsen | Jan. 9, 1923 |
| 2,201,183 | Kelley | May 21, 1940 |
| 2,373,155 | White | Apr. 10, 1945 |
| 2,377,383 | Slovak | June 5, 1945 |